US009296833B2

(12) United States Patent
Lawson et al.

(10) Patent No.: US 9,296,833 B2
(45) Date of Patent: Mar. 29, 2016

(54) METHOD FOR CONTROLLING BUBBLE FORMATION IN POLYMERIZATION REACTORS

(75) Inventors: Kevin W. Lawson, Houston, TX (US); John D. Hedengren, Houston, TX (US); Lawrence C. Smith, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 432 days.

(21) Appl. No.: 13/702,845

(22) PCT Filed: Jul. 16, 2010

(86) PCT No.: PCT/US2010/042249
§ 371 (c)(1),
(2), (4) Date: Feb. 14, 2013

(87) PCT Pub. No.: WO2012/005740
PCT Pub. Date: Jan. 12, 2012

(65) Prior Publication Data
US 2013/0203946 A1    Aug. 8, 2013

(51) Int. Cl.
*C08F 2/14* (2006.01)
*C08F 2/38* (2006.01)
*C08F 110/06* (2006.01)
*C08F 2/01* (2006.01)
(Continued)

(52) U.S. Cl.
CPC ... *C08F 2/01* (2013.01); *C08F 2/00* (2013.01); *C08F 2/14* (2013.01); *C08F 110/06* (2013.01); *C08F 2400/02* (2013.01)

(58) Field of Classification Search
USPC ................................................. 526/61, 905
See application file for complete search history.

(56) References Cited

U.S. PATENT DOCUMENTS

| 3,636,326 | A | 1/1972 | Smith et al. |
| 4,620,049 | A | 10/1986 | Schmidt et al. |
| 5,682,309 | A | 10/1997 | Bartusiak et al. |

(Continued)

FOREIGN PATENT DOCUMENTS

| EP | 0 432 555 | 6/1991 |
| EP | 0 900 590 | 3/1999 |

(Continued)

OTHER PUBLICATIONS

Chilekar et al., "*Bubble Size Estimation in Slurry Bubble Columns From Pressure Fluctuations*", AICHE Journal, vol. 51, No. 7, pp. 1924-1937, May 2, 2005.

*Primary Examiner* — Fred M Teskin
(74) *Attorney, Agent, or Firm* — Chad A. Guice; Jamie Sullivan

(57) ABSTRACT

Disclosed herein are methods for controlling bubble formation in a polymerization reactor. The method includes: (a) determining a concentration of at least one component at a location in the reactor using a mathematical model; (b) determining a vapor pressure of the composition based at least in part upon the concentration of the component; (c) determining an operating pressure of the reactor at the location; (d) determining a pressure difference as $\Delta P = P_X - P_V$, wherein $P_X$ is the operating pressure and $P_V$ is the vapor pressure; (e) comparing the $\Delta P$ to a threshold value; and (f) implementing an effect when the $\Delta P$ is less than the threshold value.

22 Claims, 2 Drawing Sheets

(51) Int. Cl.
*C08F 2/00* (2006.01)
*C08F 210/16* (2006.01)

(56) References Cited

U.S. PATENT DOCUMENTS

| | | |
|---|---|---|
| 6,204,344 B1 | 3/2001 | Kendrick et al. |
| 6,301,546 B1 | 10/2001 | Weinstein et al. |
| 6,718,234 B1 | 4/2004 | Demoro et al. |
| 7,678,341 B2 | 3/2010 | Smith |
| 2002/0065445 A1 | 5/2002 | Arrivat et al. |
| 2005/0020784 A1 | 1/2005 | Noll |
| 2007/0003450 A1 | 1/2007 | Burdett et al. |
| 2010/0289482 A1 | 11/2010 | Markel et al. |

FOREIGN PATENT DOCUMENTS

| | | |
|---|---|---|
| WO | WO 01/82008 | 11/2001 |
| WO | WO 2009/107927 | 9/2009 |
| WO | WO 2011/149769 | 12/2011 |

METHOD FOR CONTROLLING BUBBLE FORMATION IN POLYMERIZATION REACTORS

CROSS-REFERENCE TO RELATED APPLICATIONS

This is a National Stage Application filed under 35 U.S.C. 371 and claims priority to and the benefit of International Application No. PCT/US2010/042249 entitled "Method For Controlling Bubble Formation In Polymerization Reactors," which was filed on Jul. 16, 2010.

FIELD

This invention relates to a method for preparing polyolefins from olefin monomers in polymerization reactors under conditions that maintain a sufficiently low vapor pressure to reduce or avoid bubble formation.

BACKGROUND

Polypropylene homopolymers and copolymers are produced in a variety of reactors, such as loop polymerization reactors (e.g., slurry loop reactors).

Within the reactor, it is often desirable to increase the temperature to improve catalyst efficiency and/or increase product crystallinity and/or increase the energy efficiency to flash liquid components from the solid product. It may also be desirable to increase the hydrogen concentration of the reactor composition to reduce product molecular weight. However, these adjustments can also increase the vapor pressure of the composition, which may cause gas bubbles to form if the vapor pressure is sufficiently close to, or exceeds, the operating pressure. The bubbles can cause operational difficulties, such as errors in density measurements and loss of slurry circulation.

That said, the vapor pressure of the slurry is difficult to estimate because of conditions with the reactor (e.g., concentrations of components) are difficult to calculate. Specifically, it is difficult to achieve mass balance of the hydrogen and "unknown" components of the liquid vapor pressure due to unmetered losses of hydrogen and other components and low accuracy of hydrogen reaction rate estimates. Moreover, the nature of the reaction slurry (solid reactive polymer particles dispersed in the reaction liquid) makes it extremely difficult to reliably sample and measure component concentrations directly.

When a bubbling condition limit is reached or even approached, measures can be taken to restore or retain the slurry in its non-bubbling condition. One approach is to reduce the slurry temperature by increasing the cooling. Such cooling can be controlled by reducing the temperature of a cooling liquid that surrounds the reactor, e.g., an external cooling jacket surrounding a leg of the reactor loop. U.S. Pat. No. 7,678,341, incorporated herein by reference for this purpose.

WO/2001/082008 discloses a method for monitoring signals associated with downstream process equipment, e.g., electrical current, voltage or frequency signal, hydraulic pressure signals, or pneumatic pressure signals, to detect transients present in the signal that infer an associated change in product quality. An upstream process parameter can be adjusted in response to the inferred change in quality of the product, e.g., polypropylene.

U.S. Pat. No. 6,301,546 teaches detecting and monitoring changes in the properties of a fluidized bed of catalyst solids used to make synthesis gas which measures the magnitude of differential pressure fluctuations taken at different levels of bed elevation. Fluctuations in the pressure difference measured across a vertical section of the bed are related to the size of vapor-solid "bubbles" in the fluidized solids and can be used to track changes in the bed.

U.S. Pat. No. 6,718,234 discloses a system for online inference and control of physical and chemical properties of polypropylene and its copolymers. The system uses models for the inference of physical and chemical properties that are not continuously measured and relevant models to control these properties. Controlled variables include the power of the circulation pump, the opening of the valve that controls the temperature of each loop reactor, and the difference between the reactor temperature and the bubble point of the liquid within each loop reactor.

To date, there are no reliable analytical methods to detect bubbling within the reactor so that measures can be taken to limit or eliminate it. As such, to err on the side of caution, polymerization reactors typically must operate at pressures well above the vapor pressure of the slurry liquid circulating through the reactor.

However, the desire to reduce catalyst cost and increase crystallinity and melt flow rates (MFRs) of the homopolymers and copolymers (e.g., impact copolymers) creates an incentive to operate the reactors at higher reactor temperatures and increased hydrogen concentrations. Moreover, the desire to increase plant capacity to reduce the capital and operating cost per unit of production creates an incentive to raise the reactor operating temperature. However, these adjustments tend to increase vapor pressure of the circulating slurry in the reactor.

That said, it would be useful to provide a method for determining when a slurry liquid circulating through a reactor has reached or surpassed a point at which bubble formation occurs to provide improved product and reactor efficiency while avoiding excessive bubbling or near-bubbling conditions.

SUMMARY

It has now been discovered that optimal conditions can be maintained for producing polyolefins in a loop polymerization reactor by determining vapor pressure in the slurry loop reactor system continuously on-line and comparing it to on-line calculations of the reactor operating pressure at one or more locations within the reactor. A minimum robust operating reactor pressure to vapor pressure differential can then be defined, and process controls used to allow operation at the maximum possible reaction slurry vapor pressure, while minimizing the likelihood of a disruption in the slurry circulation due to bubble formation.

As the vapor pressure of the reaction slurry in a reactor nears operating pressure, differences in physical properties of the slurry arise at different locations within the reactor as a result of the hydrostatic head (i.e., the pressure at a given point in a liquid measured in terms of the vertical height of a column of the liquid needed to produce the same pressure) and dynamic pressure gradient imposed by the slurry reactor pump. By determining slurry vapor pressure based on individual components making up the slurry, determining operating pressure at least one location in the reactor, and determining the operating pressure at least one other desired location in the reactor, the onset of bubbling can be anticipated or detected at the desired location when a threshold value for the difference between operating pressure and vapor pressure is reached. Bubbling can then be controlled or avoided by altering conditions in the reactor to maintain or restore a sufficient threshold between the operating pressure within the reactor, especially at the desired location, and the reaction slurry vapor pressure. This allows for operation of the reactor at or near optimal levels for a particularly desired product.

The present invention relates to a method controlling bubble formation in a polymerization reactor, the reactor comprising a composition containing at least one component, the method comprising:

(a) determining a concentration of the at least one component at a location in the reactor using a mathematical model;
(b) determining a vapor pressure of the composition based at least in part upon the concentration of the at least one component;
(c) determining an operating pressure of the reactor at the location;
(d) determining a pressure difference as $\Delta P = P_X - P_V$, wherein $P_X$ is the operating pressure and $P_V$ is the vapor pressure;
(e) comparing the $\Delta P$ to a threshold value, wherein the threshold value reflects the desired difference between the vapor pressure and operating pressure, wherein a $\Delta P$ greater than the threshold value produces an acceptable amount of bubble formation; and
(f) implementing an effect when the $\Delta P$ is less than the threshold value.

The present invention further relates to a method for controlling bubble formation in a polypropylene polymerization reactor, the reactor comprising a composition containing at least one component, the method comprising:

(a) determining a concentration of at least one component in the reactor composition at a location in the reactor using a mathematical model;
(b) determining a vapor pressure of the composition based at least in part upon the concentration of the component;
(c) determining an operating pressure of the reactor at the location;
(d) determining a pressure difference as $\Delta P = P_X - P_V$, where $P_X$=the operating pressure and $P_V$=the vapor pressure;
(e) implementing an effect when the $\Delta P$ is less than the threshold value, wherein the effect comprises altering at least one process parameter; and
(f) implementing an effect when the $\Delta P$ is less than the threshold value.

DETAILED DESCRIPTION

Figure 1:
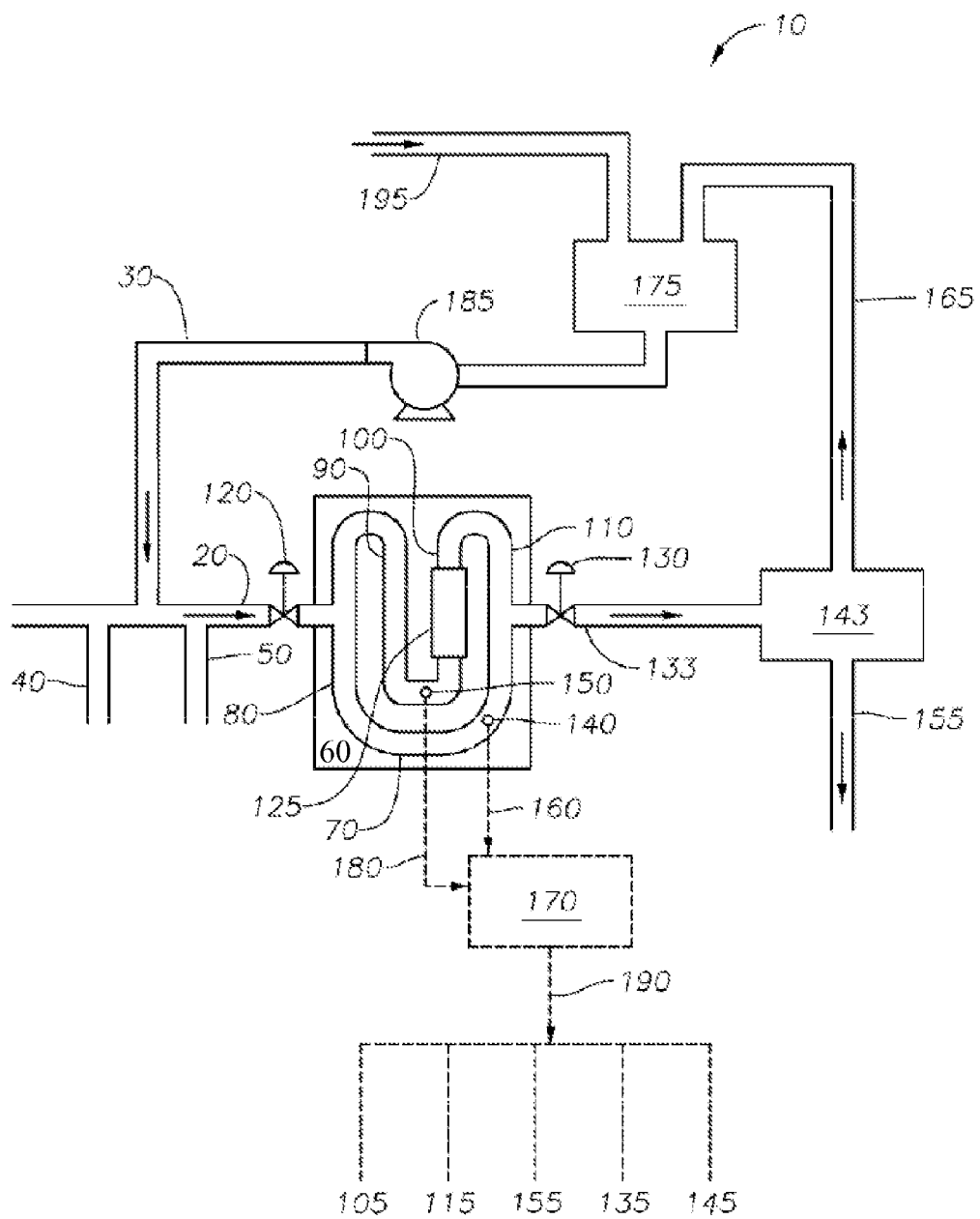
FIG. 1 is a process flow diagram for a slurry loop polymerization reactor for making polypropylene from propylene according to the method of the present invention.

As noted above, the present invention relates to a method for controlling bubble formation in a polymerization reactor, the reactor comprising a composition containing at least one component. The method comprises: (a) determining a concentration of the at least one component at a location in the reactor using a mathematical model; (b) determining a vapor pressure of the composition based at least in part upon the concentration of the at least one component; (c) determining an operating pressure of the reactor at the location; (d) determining a pressure difference as $\Delta P = P_X - P_V$, wherein $P_X$ is the operating pressure and $P_V$ is the vapor pressure; (e) comparing the $\Delta P$ to a threshold value, wherein the threshold value reflects the desired difference between the vapor pressure and operating pressure, wherein a value greater than the threshold value produces an acceptable amount of bubble formation; and (f) implementing an effect when the $\Delta P$ is less than the threshold value.

Any type of reactor that is suitable to make polyolefins (e.g., polypropylene and polyethylene in solution or slurry phase) may be used herein. Conveniently, the reactor is a slurry loop polymerization reactor, such as a bulk polypropylene reactor.

A slurry loop polymerization reactor can generally be described as a loop-shaped continuous tube. Most loop reactors have four, six, or eight straight pipes segments (e.g., legs). An example of such a loop-slurry reactor is described in U.S. Pat. No. 5,565,175, which is incorporated by reference for this purpose. Other examples of suitable loop reactors include those described in US 2009/0023872 and 2007/0022768, which are incorporated herein by reference for this purpose.

In one embodiment, the invention may be used in connection with a plurality of reactors, in parallel and/or in series. One aspect of the present invention is directed to a series polypropylene reactor comprising a first and an optional second loop reactor (or first or second "loop") allowing flow of polypropylene, catalyst, hydrogen and propylene (and optionally a diluent) therebetween, wherein each loop comprises from six to eight legs, each leg having fluid connections there between. In one embodiment, comonomer may also be injected into the first, second, or both loops. Comonomers include ethylene and $C_4$ to $C_{12}$ alpha-olefins, or cyclic olefins. Preferable comonomers include ethylene, 1-butene, 1-pentene, 1-hexene, and 1-octene.

The flow of materials may be assisted by one or more fluid circulating devices. Desirably, the fluid circulating devices are designed to provide high velocity of motion and a very intensive and well-defined mixing pattern of the reactor constituents. Suitable fluid circulating devices include pumps (e.g., axial pumps), pressure differentials and other means as are commonly known in the art. The flow of materials in certain embodiments can be achieved though fluid connections such as piping, conduits and other means of allowing liquids and/or suspensions (e.g., a slurry of liquid propylene and solid polymer material) as is commonly known in the art to flow from one place to another without exposure to the atmosphere. In various embodiments, the reactor may be totally or partially jacketed with cooling water in order to remove heat generated by polymer polymerization.

The reactor may comprise a composition (e.g., a slurry) containing one or more components. Components include olefin monomer (e.g., propylene or ethylene), catalyst, hydrogen, polyolefin (e.g., polypropylene or polyethylene), contaminants, scavengers, additives and diluents which may be circulated therein. Propane can also be present as a component, e.g., as an impurity or vapor pressure decreasing component. In one embodiment, the composition is an at least partially vaporizable liquid. It will be understood that the components of the composition may be supplied to the reactor as reactants (e.g., olefin monomer, catalyst and hydrogen), or may be generated during polymerization (e.g., polyolefin). The composition may comprise, for example, at least monomer, solid catalyst particles, and solid polypropylene granules. In another embodiment, the composition comprises at least one of ethylene, propane, propylene, hydrogen, and polypropylene. As used herein, "polypropylene" includes both homopolymers of propylene and copolymers of propylene and another monomer-derived unit where the propylene-derived units comprise at least 50 wt % of the polymer. As used herein, "polyethylene" includes both homopolymers of ethylene and copolymers of ethylene and another monomer-derived unit where the ethylene-derived units comprise at least 50 wt % of the polymer.

The catalyst can be any suitable polymerization catalyst, such as a titanium/magnesium chloride based Ziegler-Natta catalyst or a metallocene catalyst, such as a metallocene catalyst comprising a Group 4 metal from the Periodic Table of Elements. In one embodiment, the composition comprises at least one of ethylene, propane, propylene, hydrogen, and polypropylene.

As discussed above, the methods of the present invention includes:
(a) determining a concentration of at least one component of the composition at a location in the reactor using a mathematical model.

The component concentration may be determined using any known or hereinafter devised method. In one embodiment, the concentration is estimated. However, in other embodiments, the concentration is determined precisely.

For present purposes, a mathematical model is a model that uses mathematical language to describe a system. Mathematical models are usually composed by variables, which are abstractions of quantities of interest in the described systems, and operators that act on these variables, which can be algebraic operators, functions, differential operators, etc. If all the operators in a mathematical model exhibit linearity, the resulting mathematical model is defined as linear. A model is considered to be nonlinear otherwise. Control of process variables in petrochemical plants based on prior operating experience can be manually carried out by periodically taking product samples to be tested, while maintenance and correction actions concerning operating conditions are taken in order to obtain a product having desired characteristics.

On the other hand, rigorous and empirical modeling techniques may be used to build process models. These mathematical models are able to infer the value of certain process variables which are measured periodically based on the values of other process variables which are measured continuously.

Mathematical models can also be used to predict the future behavior of process variables resulting from modifications of the plant operating conditions. Rigorous modeling techniques are based in the natural laws which dictate the fundamental relationships among process variables. Rigorous models are difficult to obtain and demand a high level of knowledge about the process. Besides, the complexity of the equations that constitute the rigorous model can make it inadequate for on line implementation due to the long time necessary for its execution without efficient computer software for large-scale problems.

Techniques of empirical modeling do not require such a deep knowledge about the process and result in simpler mathematical models that can be executed quickly, permitting real time execution. Yet empirical models are typically not used in operating conditions different from those used in its identification. Linear and nonlinear regression models and artificial neural networks are examples of empirical modeling techniques commonly cited in the open literature.

Inputs to a polymerization system can be manipulated variables or disturbance variables. Manipulated variables are adjusted to maintain controlled variables at desired values, or setpoints. Manipulated variables include coolant or heating medium flow rates, gas or liquid flow rates for pressure control, monomer, solvent, or initiator feed rate, and agitator speed. Disturbance variables are variables which are not controllable by an operator, although their effects can be eliminated or countered by adjusting manipulated variables.

In one embodiment, the concentrations are determined from a mathematical model based on fundamental and empirical correlations based on material and energy balances, polymer molecular modeling, and consumption of reactants. Such equations can be solved simultaneously with a large scale nonlinear solver to provide estimates of polymer properties, reactor concentrations and other operating conditions.

In one embodiment, the mathematical model is non-linear. For example, a non-linear calculation (NLC) model based on first principles to manage a large heat/mass/reaction balance on the system may be used to provide concentration data. In one embodiment, the model based on material and energy composition equations to manage a large heat/mass/reaction balance on the system. Energy and material are tracked as inputs to model to simulate the process and provide online inferential estimates of reactor conditions. For process variables that are predicted by the model and measured, select unmeasured parameters are optimized to maintain consistency between the model and process. From this model, accurate information about the slurry concentration is known which can be used to estimate the slurry vapor pressure. This model is discussed in more detail in U.S. Pat. No. 5,682,309, which is incorporated herein by reference for this purpose.

In one embodiment, the model can be used for vapor pressure and/or bubble point temperature calculations wherein the concentrations from the reactor model provide a real-time indication of unmeasured current process parameters that constitute the vapor pressure and bubble point calculations. In other words, the model can provide an instantaneous indicator of such properties during grade transitions, reactor start-up and reactor shutdown conditions, as well as at steady control levels.

For example, the model may estimate the concentrations of the component(s) in the reactor composition by material balance and individual species balances. This is accomplished by determining the inlet flows and compositions, outlet flows and compositions, and calculation of the consumption and generation of individual species within the reactors. In this application, concentrations of propylene, propane, ethylene, hydrogen, catalyst, polymer are calculated at various points of interest for the vapor pressure and bubble point monitoring. As used herein, "points of interest" include locations where it is desirable to avoid bubble formation. With momentary reference to FIG. 2, these include Reactor 202 and 204 at the top of the reactors and at the recirculation pump inlets.

The model may further use the concentrations to determine vapor pressure and bubble point temperature. For example, this calculation of the vapor pressure may be accomplished by using standard vapor pressure correlations to relate liquid composition and temperature to vapor pressure. In this case, the Antoine equation provided sufficient accuracy over the region of interest for individual species saturation pressure. These individual species saturation pressures were combined through Dalton's law of partial pressure where the vapor pressure of a mixture is the summation of the contribution by the individual components of the mixture. A common approach is to use Raoult's law is used to approximate the contribution of vapor pressure for each component.

Calculation of the bubble point temperature may be accomplished by determining the temperature at which the vapor pressure of the liquid mixture is equal to the pressure at multiple locations within the reactor. This calculation is performed through an iterative nonlinear programming solver to solve for the temperature at which bubbling is expected.

Moreover, the model can provide dynamic constraints for hydrogen addition to the reactor, e.g., where reactor grade transitions involve changes in hydrogen feed rates. To attain faster transitions, feed rate can be overcompensated during transition to get the reactor concentrations to new levels. When increasing hydrogen flow to the reactor, a maximum level of overshoot is governed by the solubility of hydrogen in the reactor effluent. This constraint can limit the speed of the transition owing to bubble formation concerns. With dynamic calculation of reaction slurry vapor pressure, the constraint limit can be dynamically adjusted based on current operating conditions. One example of this is during grade transitions to a lower molecular weight product. It is often desirable to speed up the transition by overshooting the instantaneous prosperities of the product to achieve final product that is within prescribed specifications. Hydrogen concentration may be raised to a higher value during this transition than is typically maintained for steady control. During this period, the speed of the transition may depend on the constraint imposed by the vapor pressure of the reactor mixture. Running closer to this constraint may be desirable for reduced transition losses.

Process measurements are incorporated as direct model inputs or through parameter changes to align measured and model values. Concentrations of the non-solid components of the circulating slurry, e.g., propylene, propane, and ethylene, are typically measured in mol %, while hydrogen is typically measured in mol ppm. A thermodynamic package, such as PRO/II™ process simulation software, a steady-state simulator enabling improved process design and operational analysis, designed to perform rigorous mass and energy balance calculations for a wide range of chemical processes with chemical component library (or a data library supplemented by user experience), or an on-line model derived therefrom, may then be used to calculate the slurry vapor pressure.

PRO/II™ is commercially available from Invensys Operations Management of Plano, Tex., USA. An off-line simulation package, such as PRO/II with its chemical component library (e.g., Soave Redlich Kuong (SRK) equation of state or a data library supplemented by user experience) for thermodynamics, can then be used to calculate the slurry vapor pressure under steady-state conditions. The calculations of on-line reactor concentrations, bubble point, and vapor pressure are performed with a nonlinear programming solver (such as APOpt™ currently commercially available from AP Optimization Services, Inc.) as derived from the PRO/II® off-line simulations. This solver receives measured inputs from the process to constitute a virtual plant that runs in parallel to the actual process. Vapor pressures and bubble point temperatures are then transmitted to the Distributed Control System (DCS) for operator display, notification through alarm limits, and history collection. The bubble point calculations may also be implemented in a control application to automatically regulate the approach to the constraints during transitions.

In another embodiment of the method of the invention, the mathematical model determines the concentration as a function of the material balances in the reactor and associated reaction process systems.

In still another embodiment of the method of the invention, the material balances and the components are implemented as equations in the mathematical model.

In yet another embodiment of the method of the invention, the vapor pressure is a function of at least one of temperature and at least one component concentration of the composition.

The location of vapor pressure estimation may be any location on the reactor. In one embodiment, the location is the point of lowest operating pressure in the reactor, which is typically at or near an uppermost location within the reactor. In another embodiment, the location is determined at a point immediately upstream of the pump inlet.

As discussed above, the methods of the present invention further include (b) determining a vapor pressure of the composition based at least in part upon the concentrations of at least one of the components. Vapor pressure is generally calculated according to Raoult's law as the sum of the partial pressures of the components of the composition:

$$P_{total} = \sum_i P_i X_i$$

where $P_{total}$ is vapor pressure of the slurry, i is a component index, $P_i$ is the vapor pressure of the component, and X is the concentration of the component, expressed as a mole fraction.

As part of the calculation of the vapor pressure of the slurry, the reactor temperature (or input temperature) may be measured directly at suitable locations within the reactor, e.g., at the reactor temperature control point which is located at the lower section of one of the loop reactor legs.

In an embodiment, the vapor pressure is determined as a function of at least one of temperature, inlet flow rates, density, and calculated chemical composition of the circulating composition. The chemical composition can be determined as a function of reactor temperatures, reactor inlet flows, overall material balances in the reactor, and estimated consumption rates in the reactor of individual components. The consumption rates are determined by sensors positioned at reactors inlets and recovery unit outlets. These analyzer and flow rate measurements determine the composition and amount of material entering and leaving the reactor unit. These measurements define an instantaneous material balance. Using this information in a material balance model of the process, allows more accurate assessments of hydrogen concentrations in the reactor slurry. Material balances and the calculated chemical composition can be implemented as equations in a mathematical model of the reactor.

In one embodiment, determination of the slurry vapor pressure and its comparison to the operating pressure throughout the reactor provide "maximum robust operating vapor pressure" defined as $VP_{max}=P_{V,max}=P_X-\Delta P_{min}$ where $P_X$ and $\Delta P_{min}$ are defined for a specific plant based on operating experience. $\Delta P_{min}$ can be positive or negative, where no bubbling is desired for values of $\Delta P_{min} \geq 0$ and limited degrees of bubbling are allowable for $\Delta P_{min} < 0$. A violation of this operating window $P_{V,max} > P_X - \Delta P_{min}$, or extreme change (dPv/dt>A, where A is the maximum desired rate of vapor pressure increase or d($\Delta P$)/dt<B, where B is maximum desired rate of $\Delta P$ decrease) could result in implementation of one or more effects.

In any other embodiment, the $P_{V,\ max}$ can be used to improve transitions by safely allowing maximum hydrogen concentrations in the reactor during transitions from one grade to another grade of reduced molecular weight. By maximizing hydrogen concentration within the reaction slurry during transition, the instantaneous molecular weight of the polymer being produced is lower than the target molecular weight of the transitioned-to product. Thus, the average molecular weight of the product leaving the reactor can reach the targeted molecular weight more rapidly, reducing transition time and total transition material that is produced.

As discussed above, the methods described herein further comprise: (c) determining an operating pressure of the reactor at a location within the reactor. The operating pressure may be determined at the same location as the concentration of the component is determined, or a different location.

In various embodiments, the operating pressure may be determined through direct measurement at one or more locations. In this regard, any pressure measurement device such as a manometer, pressure transducer, sensor and the like may be used. Suitable pressure measurement devices are commercially available from KellerAmerica, Inc., Newport News, Va., USA. In other embodiments, the operating pressure may be determined through indirect measurement of one or more properties that correlate to operating pressure, such as density.

Additionally or alternatively, the operating pressure can be determined at a desired location by measuring the operating pressure directly at another location and then estimating the operating pressure at the desired location.

In another embodiment, the operating pressure can be measured directly at one or more locations and can then be estimated at other locations in the reactor to account for the slurry flow and slurry head. For example, the operating pressure may be estimated at the location based upon measurement of an operating pressure at a different location, alone or in combination with, estimations of static and dynamic pressure losses throughout the reactor. Estimations of static and dynamic pressure losses can be determined by determining height differences between the points at which the pressure is measured and for which the pressure is to be estimated, determining or estimating the change in pressure across the pump and applying a linear dynamic pressure loss throughout the length of the reactor. For example, with reference to FIG. 1, the operating pressure may be measured at location 140 and estimated at location 150, or vice versa.

As discussed above, the methods described herein further comprise: (d) determining a pressure difference ($\Delta P$) between the vapor pressure and the operating pressure. Specifically, $\Delta P = P_X - P_V$, where $P_X$=the operating pressure and $P_V$=the vapor pressure.

In accordance with various exemplary embodiments, the methods described herein further comprise: (e) comparing the pressure difference ($\Delta P$) to a threshold value.

The "threshold value" may be any value that reflects the desired difference between the vapor pressure and operating pressure, wherein a value greater than (or optionally, equal to) this difference produces an acceptable amount of bubble formation (i.e., bubbling). An "acceptable amount of bubble formation" can be determined by the reactor operator.

In one embodiment, the threshold value reflects minimal or no formation of bubbles occurring within the reactor. In one embodiment, threshold value is determined by prior operating experience. Illustrative threshold values include about 140 kPa, (20 psi) at a location where no bubble formation can be tolerated, or about 0 kPa, (0 psi) at a location where limited bubble formation can be tolerated, or about −100 kPa (−15 psi) at a location near the top of Loop reactors when bubble formation should be avoided at the pumps located near the bottom of the reactor. However, it will be understood that any threshold value may be used.

In one embodiment, the threshold value is determined by prior operating experience. Prior operating experience means abnormal events associated with too low of a value for $\Delta P$, including reaction slurry pump power draw oscillations, unstable reactor temperature or solids concentration control, unplanned shut down of reactors due to loss of circulation.

In another embodiment, the threshold value is 0 and the location is the point of lowest operating pressure in the reactor.

In another embodiment, the threshold value is set to limit the formation of vapor bubbles. Thus 0>$\Delta P$>threshold value.

In still yet another embodiment of the method of the invention, the threshold value is set at a value that substantially prevents the formation of vapor bubbles.

In one embodiment, the threshold value is obtained by rigorous thermodynamics and suspected cases of supposed bubble formation in the loop reactors. Suspected cases of bubble formation include periods of recirculation pump amp oscillations and densitometer measurement noise. These are two of the conditions that signal a risk of bubble formation when running close to the bubble point conditions. By reducing the amount of hydrogen or thinning the slurry concentration, further evidence of bubble formation is obtained by the nature and effect of a corrective action. Corrective action may include reduction of reactor hydrogen concentration or thinning the slurry solids concentration.

In still yet another embodiment, the reactor comprises a pump (e.g., a slurry loop pump). In one embodiment, the threshold value is 0, and the pressure is measured or estimated at a point just upstream of the pump inlet. In various embodiments, the threshold value can be set to achieve one or more of: (i) limit the amplitude of pump power oscillations; (ii) limit the formation of vapor bubbles at the pump inlet; and/or (iii) limit or prevent cavitation in the pump.

In various embodiments, the methods described herein further comprise: (f) implementing an effect when the $\Delta P$ is less than or equal to a threshold value.

The effect may be any action that lowers the vapor pressure of the composition. Effects include: alerting the process operator, an automated process control sequence/interlock, and/or emergency shutdown. In one embodiment of the invention, the effect comprises altering at least one process parameter. For present purposes, a "process parameter" means a variable that is known in the art to affect liquid vapor pressure or reactor operating pressure, including reactor temperature, component concentration, especially hydrogen concentration, composition, and feed and discharge rates.

In various embodiments, the method of the invention can utilize a controller which receives data as electrical signals, relating to: 1) the vapor pressure; and/or 2) the operating pressure and calculates the difference between these pressures, and compares them with a threshold value which has been previously determined. When the controller determines the difference has exceeded the threshold value and the reactor is susceptible to excessive vapor bubble formation within the circulating slurry, it can send a signal to implement one or more effects in order to restore the reactor operation within the threshold value. Such implementing signals can include notification of a human operator.

In one embodiment, the hydrogen concentration is increased during transition from producing a first polymer to producing a second polymer of lower molecular weight, to a level sufficient to provide an instantaneous molecular weight polymer of lower molecular weight than the second polymer, such that $\Delta P$ does not drop below the threshold value. For present purposes, "instantaneous" properties means the product properties that would result after a long period of time, e.g., 10 hours, if all process conditions were held constant.

In yet another embodiment of the invention, the effect comprises restoring the value of $\Delta P$ to a desired range (e.g., above the threshold value) within a fixed period. For example, the effect may reduce the reactor temperature by causing the temperature control system to implement full cooling of the reactor. By "full cooling" is meant the reactor cooling or heat removal system is increased to its full capacity. Another effect is providing a reaction inhibitor, e.g., carbon monoxide, directly or indirectly into the loop reactors to slow or stop polymerization. Additionally or alternatively, the effect is slowing polymerization by reducing or stopping the addition of catalyst to the reactor.

Typically, the effect that restores the value of ΔP to a desired range within a fixed period reduces the reactor temperature by signaling the temperature control system to implement full or partial cooling of the reactor, e.g., by controlling heat exchangers surrounding the reactor piping, or reducing or eliminating the flow of added heat to the reactor. The effect is triggering a valve that releases a reaction inhibitor, e.g., carbon monoxide, directly or indirectly into the loop reactors. Alternatively, the effect is controlling a valve that reduces or stops the addition of catalyst to the reactor.

In one embodiment, statistical methods are applied to determine whether the difference in said physical property measurements is significantly different from the reference value. Conveniently, an effect is implemented when the difference in said physical property measurements becomes significantly different from the reference value. An effect can be continuously implemented to maintain statistical control of the difference in said physical property measurements, and optionally, statistical control is maintained by at least one of open loop feedback control, manual feedback control, automatic feedback control, and automatic feed forward control.

In one embodiment, a first effect is implemented, and if the pressure difference does not equal or exceed the threshold value within a set time, implementing one or more additional effects. The set time may be any amount of time. For example, the set time may be determined by the reactor operator. The first effect may be the same or different as the one or more additional effects.

In yet another embodiment of the method of the invention, an effect is continuously implemented to maintain control of the ΔP at a desired setpoint, and control is maintained by at least one of open loop feedback control, manual feedback control, automatic feedback control, and automatic feed forward control. For present purposes, a "setpoint" can be considered the target value of a controlled variable.

For present purposes, automatic feedback control relates to a control scenario wherein a sensing device senses and automatically responds with an effect to changes in a parameter that it controls, e.g., automatically adjusting the reaction slurry temperature controller setpoint to maintain a statistically constant value of (c). Manual feedback control relates to a control scenario wherein a human operator responds to a signal or message provided by a sensing device and/or processor, e.g. manually reducing the reaction slurry temperature controller setpoint. Automatic feed forward control relates to a control scenario wherein the future state of a sensing device is predicted from the current state of other sensing devices in the process and an automatic response is affected, e.g. a sudden increase in hydrogen concentration in a first slurry loop reactor is predicted to lead to a corresponding increase in the hydrogen concentration in a second slurry loop reactor connected downstream in series with the first slurry loop reactor, thus an automatic response to reduce the second reactor feed hydrogen or to reduce the second reactor temperature can be affected to prevent excessive bubble formation.

In an embodiment of the invention, one or more of steps (a) through (f) are conducted on a real-time basis. "Real-time basis" means the relevant steps are carried out during operation of the reactor, e.g., on-line, without shutting down or otherwise impeding reactor operation.

In another embodiment, the method of the invention is conducted during one or more of: (i) start-up of the reactor; (ii) shut-down of the reactor; (iii) steady-state operation of the reactor; and (iv) change of a reactant supplied to the reactor during a grade transition. For present purposes, "during a grade transition" means the method of the present invention is practiced during an interval in continuous reactor operation between production of a product falling within a first product specification and production of a product falling within a second product specification.

In yet another embodiment of the method of the invention, steps (a) through (f) are conducted at more than one location within the reactor.

Referring to FIG. 1, in an embodiment the invention resides in a method for monitoring and/or controlling bubble formation in a reactor 10, namely, a substantially vertical loop polymerization reactor for polymerizing olefins which operates with a circulating liquid slurry composition. Propylene feed enters a reactor inlet line 20 via propylene feed line 30, along with polymerization catalyst via catalyst inlet line 40, and optional hydrogen via hydrogen inlet line 50. The resulting reactor composition mixture enters the reactor unit 60 and passes to the substantially vertical loop 70 having a plurality of legs, 80, 90, 100, and 110. Each leg is fluidly connected to another leg at each end by bent piping. In the embodiment depicted in FIG. 1, the reactor's single loop includes four legs. In another embodiment (not shown), the series reactor comprises a first loop and a second loop wherein each loop comprises eight legs. While not shown in FIG. 1, it should be apparent to those skilled in the art that there will be a fluid connection between the loops to allow flow of liquid and/or slurry and/or gaseous material therebetween.

Propylene and, if added, hydrogen, can be separated from the polymer being produced and recycled back to the first, second, or more loops, wherein one or more of each leg of the loop or loops can be jacketed for cooling with a heat transfer medium, e.g., water. In a two-loop embodiment of the series reactor (not shown), recycled propylene and hydrogen is routed into the second loop through a recycle conduit. Heat of reaction can be removed by use of liquid heat exchanger medium flow, preferably water, through the jacket(s) 125. In one embodiment, each jacket is independently supplied with cooling water, and in another embodiment, water flows from one jacket to another in series. The circulating slurry or liquid in each loop is kept preferably at a temperature of from 50° C. to 90° C., more preferably between 60° C. and 75° C. In another embodiment, the circulating slurry or liquid in each loop is kept at a temperature below that which would cause the resulting polymer to dissolve in the monomer and/or diluent media.

Entry and exit from loop 70 can be controlled by inlet valve 120 and outlet valve 130, respectively. A first sensor capable of determining the operating pressure, is located at a location (first location) 140 on loop 70. The first sensor can measure operating pressure using a pressure sensing means and produce an electrical signal that is directed via line 160 to processor 170.

Optionally, the operating pressure at location 140 can be used to estimate the operating pressure at a second location, e.g., location 150 using a second sensor. For example, the second sensor may produce an electric signal that is a function of the gauge pressure (difference between reactor condition and the ambient condition pressure) in the lower section of the loop reactor. The second sensor produces a signal that is directed via line 180 to processor 170. The first and second sensors, for present purposes may include more than one type of sensor at a specific location.

Concentrations of components of the circulating composition, which can typically comprise propylene, propane, ethylene and hydrogen, can be estimated at location 140 and/or 150 based on a mathematical model. Component concentration is a function of overall material balances in the reactor which are measured at inlet line 20 and line outlet 130, as well as estimated consumption rates in the reactor of individual components.

The vapor pressure of the composition can then be calculated based on the estimated component concentrations. Processor 170 integrates the data to provide a calculated chemical composition value and an estimated vapor pressure for the composition.

Additionally or alternatively, component concentrations of propylene, propane, ethylene, and hydrogen can be measured within the reactor using the first and/or second sensors. The various sensors provide their respective data via, e.g., line 180. Sensors used by the bubble point application include sensors for flows, stream compositions, pressures, temperatures, and slurry density. Additionally, a heat and material balances can be used to approximate the production rate in each reactor.

Processor 170 calculates the difference between operating pressure (measured or estimated) and estimated vapor pressure and compares it with a threshold value. When this difference drops below the threshold value, the processor triggers an output signal via line 190 that can implement an effect in response to bubbling or its imminent initiation, which response can prevent, eliminate, or at least reduce the bubbling.

Figure 2:
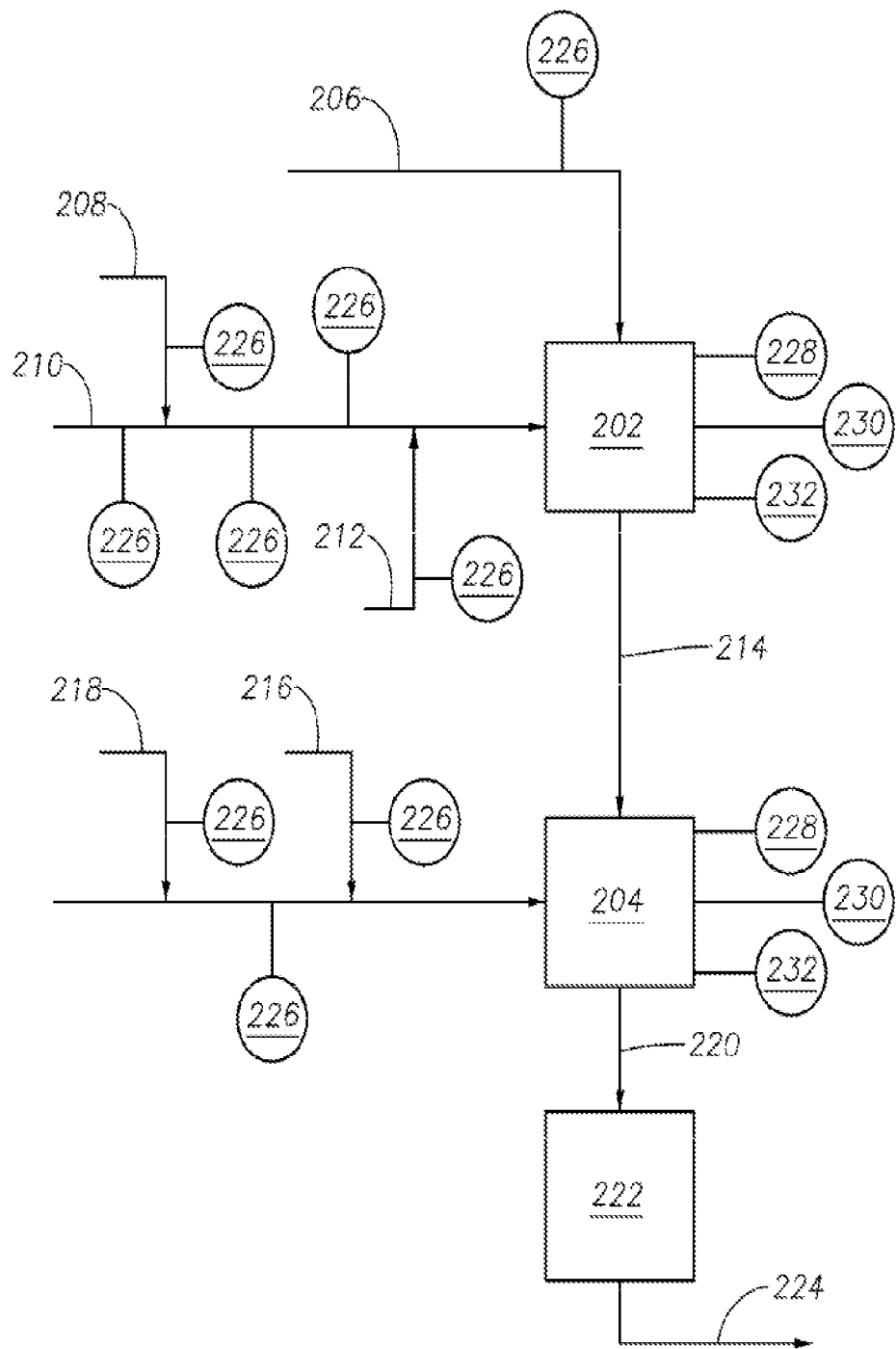
FIG. 2 is a two-reactor system for making propylene/ethylene copolymers using the bubble-monitoring method of the present invention.

With reference to FIG. 2, an exemplary reactor system for making propylene/ethylene copolymers is illustrated. As shown, reactor system comprises reactors 202 and 204. Catalyst stream 206, hydrogen stream 208, propylene and propane stream 210 and ethylene stream 212 are fed to reactor 202 to undergo at least partial polymerization to form stream 214. Stream 214, ethylene stream 216 and hydrogen stream 218 are then fed to reactor 204 to undergo additional polymerization to form stream 220. Stream 220 may then be fed to separator 222 (e.g., a high pressure separator), wherein polymer product in stream 224 is recovered. Stream 224 may subsequently undergo additional purifications. It will be understood that any of the above-referenced streams 206, 208, 210, 212, 214, 216, 218, 220 and 224 may have one or more sensors 226 to determine one or more of flow rate, component concentrations, density, pressure and temperature of the streams. Additionally or alternatively, reactors 202 and 204 may comprise one or more component concentration sensors 228, pressure sensors 230 and temperature sensors 232. Such sensors may provide measurements to be used in the mathematical model calculate the bubble temperature and/or vapor pressure. It will further be understood that reactor system may further comprise any number of conventional devices such as heat exchangers, pumps, separation devices (e.g., distillation columns) and the like.

Such an effect can include notification of a reactor operator 105, who can then manually initiate one or more procedures action to prevent, eliminate, or reduce bubbling liquid in the reactor. The processor itself can directly initiate one or more effects to this end. Such effects can include one or more of: increasing of reactor pressure or decrease of reactor temperature and/or decreasing the composition vapor pressure 115, or maintaining the vapor pressure of the composition at a maximum value without bubble formation 155. Additionally or alternately, the effect can maintain the vapor pressure of the composition at a maximum value with a limit on extent of bubbling 135—extent of bubbling being relatable to at least one of variation in power draw of a reactor pump used to circulate reactor composition, pump cavitation (which can be indicated by increased pump power draw variation, vibration or audible noise), variation in reactor temperature control, and variation in reactor reactant addition rates.

These effects can be accomplished, e.g., by reducing partial pressure of a reactor composition component, say, hydrogen or propylene, by varying flowrate in propylene inlet 30, or hydrogen inlet 50, that contributes to overall composition vapor pressure. Decreasing the flow of hydrogen has effect of reducing the overall vapor pressure of the mixture. Increasing reactant flow (principally propylene and propane) often contributes to the reduction of vapor pressure, but not necessarily. Another effect 145 can relate to decrease of reactor temperature, e.g., by controlling temperature of a heat exchange medium (or coolant, e.g., water) in a jacket 125 surrounding some or all of the reactor loop. Thus, vapor pressure of the composition can be controlled by varying at least one of: the temperature of the reactor, the amount of a vapor pressure increasing component in the composition, and the amount of a vapor pressure decreasing component in the composition. Vapor pressure increasing component can be selected from hydrogen, which can be added via line 50 and ethylene, which can be added via line 40 for mixing with the reactant stream before reactor injection. With all else constant, increased reactant flow via line 30 has the effect of reducing hydrogen concentration and propane concentration. As an inert, propane will have higher concentrations as the slurry concentration increases and the propylene conversion increases. Propane has a lower vapor pressure than propylene while hydrogen has a higher vapor pressure. By diluting the reactor with additional feed flow, the vapor pressure is typically decreased because of the higher sensitivity of vapor pressure to hydrogen concentration.

In one embodiment, the effect includes triggering a valve that releases a reaction inhibitor, e.g., carbon monoxide, directly or indirectly into the loop reactors, e.g., via line 50. Alternatively, the effect is controlling a valve that reduces or stops the addition of catalyst via line 40 to the reactor.

When polymerization has proceeded to a desired extent, e.g., as measured by the slurry concentration or production rate, the circulating slurry, whose circulation through the loop can be provided by a pressure differential, such as that provided by a suitable pump (not shown), e.g., axial flow elbow pump, can be withdrawn from the loop via line 133 wherein flow is controlled by reactor outlet valve 130. The pump inlet and outlet can be located at a suitable location in the loop, e.g., at the bottom of a leg comprising a loop. The slurry mixture passes through line 133 into separator 143, e.g., a propylene/polypropylene separator, wherein polymer is separated out and directed out of the separator as a polymer stream via line 155. Conduit 165 allows for the unreacted fluids and gases to be directed to the propylene drum 175, whence they can be directed back to the reactor via lines 30 and 20, impelled by circulating pump 185. Fresh propylene can be added to the system via the propylene drum 175 through line 195. Propane concentration in the drum 175 can be controlled by taking an appropriate purge of propane enriched stream 165.

In any embodiments described herein, there may also be included in the fluid stream a diluent such as propane, or other hydrocarbon. The pressure of the reacting monomers and optional diluent in the loops can typically range from 2760 to 3930 kPa (400 psig to 800 psig), preferably between 3310 to 3930 kPa (480 and 570 psig).

The present invention can be further described as follows:
A method for controlling bubble formation in a polymerization reactor, the reactor containing a composition comprising at least one component, the method comprising:
1. (a) estimating a concentration of the at least one component at a location in the reactor using a mathematical model;
   (b) determining a vapor pressure of the composition based at least in part upon the concentration of the at least one component;
   (c) determining an operating pressure of the reactor at the location;
   (d) determining a pressure difference as $\Delta P = P_X - P_V$, wherein $P_X$ is the operating pressure and $P_V$ is the bubble pressure;
   (e) comparing the $\Delta P$ to a threshold value, wherein the threshold value reflects the desired difference between the vapor pressure and operating pressure, wherein a $\Delta P$ greater than the threshold value produces an acceptable amount of bubble formation; and
   (f) implementing an effect when the $\Delta P$ is less than the threshold value.
2. The method of 1, wherein one or more of (a) through (f) are conducted on a real-time basis.
3. The method of 1, wherein the method is conducted during change of a reactant supplied to the reactor during a grade transition.
4. The method of 1, wherein steps (a) through (f) are conducted at more than one location within the reactor.
5. The method of 1, wherein the at least one component is one or more of polyolefin, olefin, hydrogen and catalyst.
6. The method of 1, wherein the mathematical model is non-linear.
7. The method of 6, wherein the mathematical model estimates the concentration as a function of at least one of reactor temperature, reactor inlet flow and estimated consumption rate of one or more components.
8. The method of 7, wherein the mathematical model determines the concentration as a function of the material balances in the reactor and associated reaction process systems.
9. The method of 8, wherein the material balances and the components are implemented as equations in the mathematical model.
10. The method of 1, wherein the estimated vapor pressure is a function of at least one of temperature and the concentration of at least one component of the composition.
11. The method of 1, wherein the operating pressure is determined through one of: (i) direct measurement at the location; (ii) estimation at the location based upon measurement of an operating pressure at a different location; or (iii) estimations of static and dynamic pressure losses throughout the reactor.
12. The method of 1, wherein the threshold value is determined by prior operating experience.
13. The method of 1, wherein the location is the point of lowest operating pressure in the reactor and the threshold value is 0.
14. The method of 1, wherein the threshold value is set at a value that substantially prevents the formation of vapor bubbles.
15. The method of 1, wherein the reactor is a slurry loop reactor and the slurry loop reactor comprises a pump having a pump inlet.
16. The method of 15, wherein the location is immediately upstream of the pump inlet, and the threshold value is 0.
17. The method of 15, wherein the threshold value is set at a value that substantially prevents the formation of vapor bubbles at the pump inlet.
18. The method of 17, wherein the threshold value is set to limit the amplitude of the pump power oscillations.
19. The method of 17, wherein the threshold value is set to limit the cavitation of the pump.
20. The method of 1, wherein the effect comprises increasing the operating pressure.
21. The method of 20, wherein the effect comprises altering at least one process parameter.
22. The method of 21, wherein the process parameter is selected from at least one of reactor temperature and component concentration.
23. The method of 21, wherein the composition comprises hydrogen as a component and the process parameter is hydrogen concentration.
24. The method of 23, wherein the hydrogen concentration is increased during transition from producing a first polymer to producing a second polymer of lower molecular weight, to a level sufficient to provide an instantaneous molecular weight polymer of lower molecular weight than the second polymer, such that $\Delta P$ does not drop below the threshold value.
25. The method of 20, wherein the effect is implemented manually or automatically.
26. The method of 25, wherein the effect comprises increasing the difference $\Delta P$ to above the threshold value.
27. The method of 25, wherein the effect reduces the reactor temperature.
28. The method of 25, wherein the effect provides a reaction inhibitor directly or indirectly into the reactor.
29. The method of 28, wherein the reaction inhibitor includes carbon monoxide.
30. The method of 25, wherein the effect reduces or stops the addition of a catalyst to the reactor.
31. The method of 1, wherein an effect is continuously implemented to maintain control of the $\Delta P$ at a setpoint, and wherein control is maintained by at least one of open loop feedback control, manual feedback control, automatic feedback control, and automatic feed forward control.
32. A method for controlling bubble formation in a polypropylene polymerization reactor, the reactor comprising a composition containing at least one component, the method comprising:
   (a) estimating a concentration of at least one component in the reactor composition at a location in the reactor using a mathematical model;
   (b) determining an estimated vapor pressure of the composition based at least in part upon the concentration(s) of the component(s);
   (c) determining an operating pressure of the reactor at the location;
   (d) determining a pressure difference as $\Delta P = P_X - P_V$, where $P_X$ = the operating pressure and $P_V$ = the vapor pressure; and
   (e) implementing an effect when the $\Delta P$ is less than the threshold value, wherein the effect comprises altering at least one process parameter.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method for controlling bubble formation in a polymerization reactor, the reactor containing a composition comprising at least one component, the method comprising:
   (a) determining a concentration of the at least one component in the composition at a location in the reactor using a mathematical model;
   (b) determining a vapor pressure of the composition based at least in part upon the concentration of the at least one component;
   (c) determining an operating pressure of the reactor at the location;
   (d) determining a pressure difference as $\Delta P = P_X - P_V$, wherein $P_X$ is the operating pressure and $P_V$ is the vapor pressure;
   (e) comparing the $\Delta P$ to a threshold value, wherein the threshold value reflects a desired difference between the vapor pressure and operating pressure, and wherein a $\Delta P$ that is greater than the threshold value produces an acceptable amount of bubble formation; and
   (f) implementing an effect when the $\Delta P$ is equal or less than the threshold value.

2. The method of claim 1, wherein one or more of (a) through (f) are conducted on a real-time basis.

3. The method of claim 1, wherein the method is conducted during change of a reactant supplied to the reactor during a grade transition.

4. The method of claim 1, wherein steps (a) through (f) are conducted at more than one location within the reactor.

5. The method of claim 1, wherein the at least one component includes one or more of polyolefin, olefin, hydrogen and catalyst.

6. The method of claim 1, wherein the mathematical model estimates the concentration as a function of at least one of reactor temperature, reactor inlet flow and consumption rate of one or more components of the composition.

7. The method of claim 6, wherein the mathematical model determines the concentration as a function of the material balances in the reactor.

8. The method of claim 1, wherein the operating pressure is determined through one of: (i) direct measurement at the location; (ii) estimation at the location based upon measurement of an operating pressure at a different location; or (iii) estimations of static and dynamic pressure losses throughout the reactor.

9. The method of claim 1, wherein the threshold value is set at a value that substantially prevents the formation of vapor bubbles.

10. The method of claim 1, wherein the reactor comprises a pump having a pump inlet, and wherein the location is immediately upstream of the pump inlet, and the threshold value is 0.

11. The method of claim 10, wherein the reactor is a slurry loop reactor.

12. The method of claim 1, wherein the threshold value is set to limit the amplitude of the pump power oscillations located at points of interest.

13. The method of claim 1, wherein the threshold value is set to limit the cavitation of the pump located at points of interest.

14. The method of claim 1, wherein the effect comprises increasing the operating pressure.

15. The method of claim 1, wherein the effect comprises altering reactor temperature or component concentration.

16. The method of claim 1, wherein the composition comprises hydrogen as a component and the effect comprises altering hydrogen concentration.

17. The method of claim 1, wherein the effect reduces the reactor temperature.

18. The method of claim 1, wherein the effect provides a reaction inhibitor directly or indirectly into the reactor.

19. The method of claim 18, wherein the reaction inhibitor includes carbon monoxide.

20. The method of claim 1, wherein the effect reduces or stops the addition of a catalyst to the reactor.

21. The method of claim 1, wherein an effect is continuously implemented to maintain control of the $\Delta P$ at a setpoint, and wherein control is maintained by at least one of open loop feedback control, manual feedback control, automatic feedback control, and automatic feed forward control.

22. A method for controlling bubble formation in a slurry loop polypropylene polymerization reactor, the reactor containing a composition comprising at least one component, the method comprising:
   (a) determining a concentration of at least one component in the reactor composition at a location in the reactor using a mathematical model;
   (b) determining a vapor pressure of the composition based at least in part upon the concentration of the component;
   (c) determining an operating pressure of the reactor at the location;
   (d) determining a pressure difference as $\Delta P = P_X - P_V$, where $P_X$ = the operating pressure and $P_V$ = the vapor pressure;
   (e) comparing the $\Delta P$ to a threshold value, wherein the threshold value reflects a desired difference between the vapor pressure and operating pressure, and wherein a $\Delta P$ that is greater than the threshold value produces an acceptable amount of bubble formation; and
   (f) implementing an effect when the $\Delta P$ is equal or less than the threshold value, wherein the effect comprises altering at least one process parameter.

* * * * *